US006391424B1

(12) United States Patent
Suzuki

(10) Patent No.: US 6,391,424 B1
(45) Date of Patent: May 21, 2002

(54) PLASTIC SHEET HAVING CREASING LINES

(76) Inventor: Kunitsugu Suzuki, 2-231-2 Shinozakicho, Edogawa-ku, Tokyo 133-0061 (JP)

( * ) Notice: Subject to any disclaimer, the term of this patent is extended or adjusted under 35 U.S.C. 154(b) by 0 days.

(21) Appl. No.: 09/559,331

(22) Filed: Apr. 27, 2000

(30) Foreign Application Priority Data

Apr. 30, 1999 (JP) .......................................... 11-124395

(51) Int. Cl.[7] .................................................. B32B 3/30

(52) U.S. Cl. ....................... 428/167; 428/152; 428/156; 428/174

(58) Field of Search ................................ 428/156, 167, 428/152, 174

(56) References Cited

U.S. PATENT DOCUMENTS 5,302,435 A * 4/1994 Hashimoto .................. 428/167

* cited by examiner

*Primary Examiner*—Blaine Copenheaver
*Assistant Examiner*—Hai Vo
(74) *Attorney, Agent, or Firm*—Oblon, Spivak, McClelland, Maier & Neustadt, P.C.

(57) ABSTRACT

A plastic sheet having a plurality of creasing lines. Each creasing line is formed of a groove having a bottom surface and a pair of opposed side surfaces each slanting at a certain angle. A plurality of substantially semi-cylindrical ribs are formed on the bottom surface at substantially equal intervals along the longitudinal direction such that the ribs connect the opposed side surfaces. The area of a portion of the bottom surface not occupied by the ribs accounts for about 90% to about 95% the entire area of the bottom surface as measured when the ribs are not present.

2 Claims, 4 Drawing Sheets

PLASTIC SHEET HAVING CREASING LINES

BACKGROUND OF THE INVENTION

1. Field of the invention

The present invention relates to a plastic sheet which has creasing lines and is formed into a packaging container or the like.

2. Description of the Related Art

When a packaging container or casing is formed through bending of a plastic sheet, a groove-like creasing line is press-formed at each portion of the plastic sheet at which the plastic sheet is to be bent. Subsequently, the plastic sheet is bent along the creasing lines in order to complete the packaging container or casing. U.S. Pat. No. 5,302,435 discloses such a technique. Conventional plastic sheets have employed creasing lines of various shapes and structures. The structure of such a creasing line greatly affects the performance of a completed plastic container or casing.

When a packaging container is to be formed through bending a plastic sheet, as shown in FIG. 1, grooves 2 are formed on a sheet 1 punched into a planar shape corresponding to the shape of the container, and the sheet 1 is then bent along the grooves 2 to thereby complete the container as shown in FIG. 2. The grooves 2 are called "creasing lines" or simply "creasing lines." The creasing lines are formed by a process such that a member called a "creasing line-forming blade" is pressed against the sheet 1.

The technique for bending a sheet after formation of creasing lines by use of creasing line-forming blade has conventionally been used for fabrication of paper containers. However, when this technique is applied to fabrication of plastic containers, fabrication of containers having corners of a desired angle is difficult, because a plastic sheet has higher resistance against bending and higher elasticity that does a paper sheet.

Various techniques for solving the above-described problems have been proposed. One solution is employment of creasing lines having a special shape to thereby facilitate bending operation. For example, Japanese Utility Model Publication (kokoku) No. 4-9345 discloses a plastic sheet having creasing lines each formed of a groove in which projections and depressions are formed alternately on the bottom surface along the longitudinal direction thereof. Japanese Patent Application Laid-Open (kokai) No. 64-40317 discloses a plastic sheet having creasing lines each formed of a groove in which holes are formed in the bottom portion at a predetermined pitch along the longitudinal direction thereof.

In relation to a method of bending a plastic sheet, Japanese Patent Application Laid-Open (kokai) No. 2-98422 discloses a method in which a plastic sheet having creasing lines is first folded at each of the creasing lines, then unfolded to the original state, and then subjected to a bending process.

Furthermore, a creasing line-forming blade having an improved structure has been proposed. Japanese Patent Application Laid-Open (kokai) No. 1-141720 (Japanese Patent No. 2541252) discloses a creasing line-forming blade for a plastic sheet whose tip end has concave portions and convex portions arranged alternately along the longitudinal direction, wherein the concave portion has a length of 0.3 to 2 mm, the convex portion has a length of 0.02 to 0.15 mm, the tip end of the convex portion has a width not greater than 0.5 mm, and the tip angle is 30 to 130°.

A recent automatic container fabrication machine can perform, at high speed, a series of operations for bending a sheet to complete a three-dimensional container, charging a liquid or the like into the container, and sealing the container. Although the above-described techniques have enabled fabrication of containers through bending of a plastic sheet having creasing lines, when the conventional plastic sheet is used in such an automatic container fabrication machine, there arise various problems such as breakage of a creasing line portion, and failure in formation of a three-dimensional shape.

In a plastic sheet having creasing lines, bending operation is facilitated through a decrease in the thickness (residual thickness) of the plastic sheet at the bottom of each groove serving as a creasing line. However, when the residual thickness is decreased, a strong force tends to act locally at creasing line portions during bending, especially during a step of forming a plastic sheet into a final shape by use of an automatic container fabrication machine, resulting in breakage of the container from a creasing line portion. This problem of breakage becomes remarkable when holes are provided at creasing line portions in order to facilitate a bending operation.

Further, conventional plastic sheets involve a problem in relation to appearance. A packaging container formed of a plastic sheet is more excellent than a paper container in terms of transparency, because the plastic sheet can be transparent. However, when creasing lines having a complicated shape, such as creasing lines having holes as shown in Japanese Patent Application Laid-Open No. 64-40317, are employed in order to facilitate a bending operation, after completion of a container, light scatters at the creasing lines, and corner portions become conspicuous, resulting in possible impairment of the appearance of a transparent container. This is a serious problem because plastic containers—which are more expensive than paper containers—are used in order to improve the appearance of a commodity so as to give the impression of a high-quality article.

As described above, when plastic sheets are used for fabrication of packaging containers, it becomes important to cope with fabrication by use of an automatic container fabrication machine and to form creasing lines which do not impair the appearance of a resultant container.

SUMMARY OF THE INVENTION

In view of the foregoing problem, an object of the present invention is to provide a plastic sheet having creasing lines which can cope with fabrication by use of an automatic container fabrication machine and which do not impair the appearance of a resultant container.

The present invention provides a plastic sheet in which each creasing line is formed of a groove having a bottom surface and a pair of opposed side surfaces each slanting at a certain angle; and a plurality of ribs each having a shape of a semi- or half-cylinder (hereinafter referred to as "semi-cylindrical ribs") are formed on the bottom surface at substantially equal intervals along the longitudinal direction such that the ribs connect the opposed side surfaces. Preferably, the area of a portion of the bottom surface not occupied by the ribs accounts for about 90% to about 95% the entire area of the bottom surface as measured when the ribs are not present.

In the plastic sheet having creasing lines of the present invention, the semi-cylindrical ribs connecting the opposed side surfaces provide a reinforcing function. In addition, during a bending operation, stresses concentrate in the vicinity of the semi-cylindrical ribs, and consequently at the creasing lines, thus enabling formation of neat pleat lines.

The present invention further provides a method of fabricating a plastic sheet having creasing lines by use of a creasing line-forming blade. The blade has a flat tip-end surface extending in the width direction and a pair of opposed side surfaces each continuing from the tip-end surface and slanting at a certain angle. Depressions for forming the semi-cylindrical ribs are formed on the tip-end surface at substantially equal intervals. The creasing line-forming blade is pressed against a plastic sheet in order to form a creasing line having a depth 0.6 to 0.9 times the thickness of the sheet.

When the creasing line-forming blade is pressed against a plastic sheet, molecules of plastic within the plastic sheet are densified, and the pressure-subjected portion becomes hard. This increases the stability of a shape obtained through a bending operation. In the plastic sheet of the present invention, since semi-cylindrical ribs are present at substantially constant intervals, the degree of compression and other properties differ between the rib portion and the remaining flat bottom portion. This renders complex the distribution of stress at a bent portion, which conceivably contributes to an increase in shape stability.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
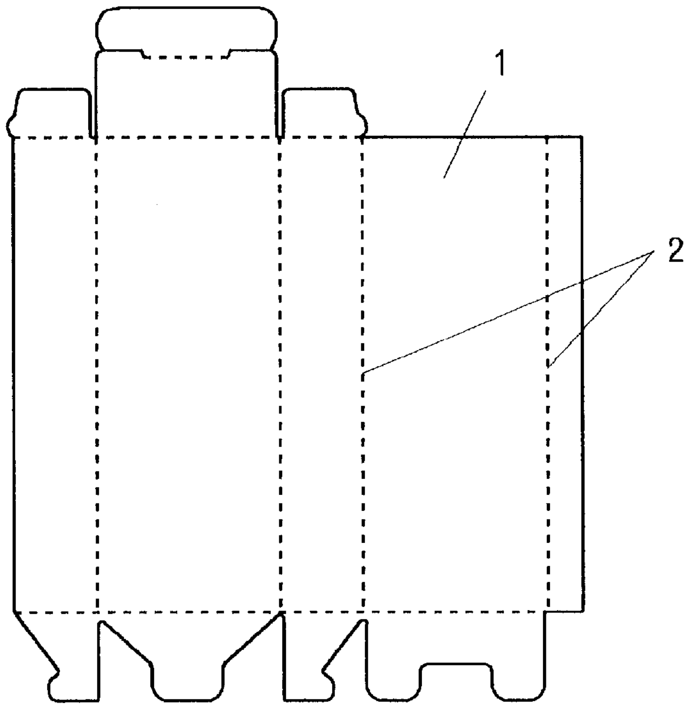
FIG. 1 is a plan view of a plastic sheet having creasing lines for a packaging container.
Figure 2:
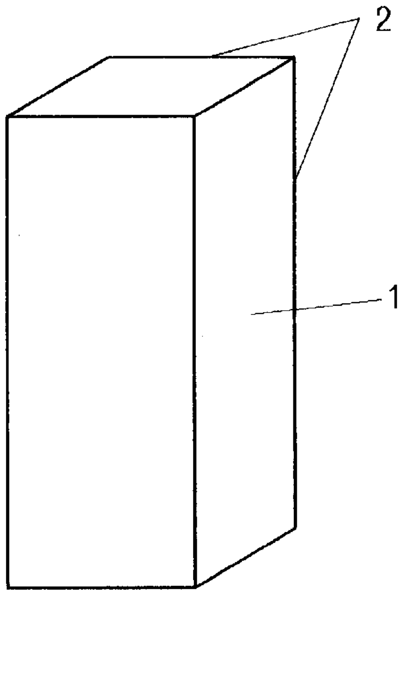
FIG. 2 is a perspective view of a container fabricated from the plastic sheet of FIG. 1.

An embodiment of a plastic sheet having creasing lines according to the present invention will be described with reference to the drawings. As shown in FIGS. 1 and 2, a plastic sheet 1 has creasing lines 2, each of which is a groove formed on one main face of the plastic sheet 1.

The plastic sheet 1 is a single-layer sheet or a multi-layer sheet formed of polyethylene terephthalate, polyvinyl chloride, polypropylene, or any other suitable resin material and has a thickness of about 0.1 mm to about 1.0 mm.

Figure 3:
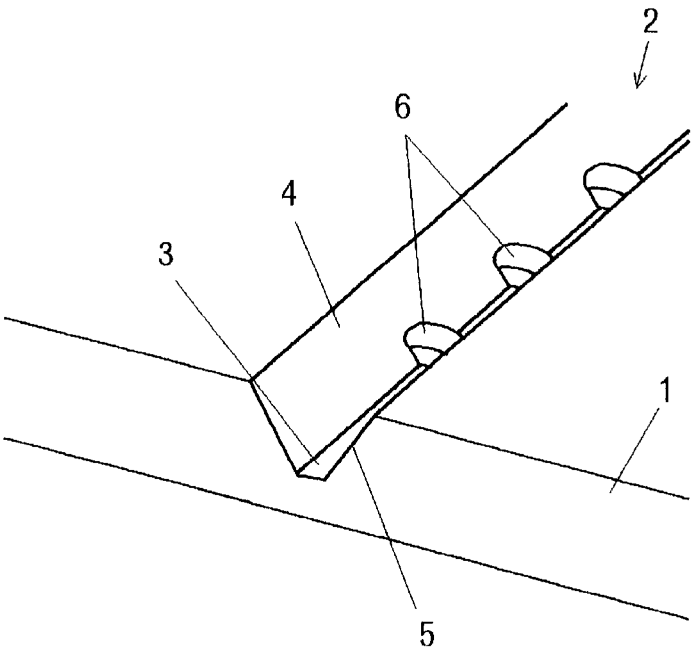
FIG. 3 is a perspective view showing the structure of a creasing line according to the present invention.

As shown in FIG. 3, each creasing line 2 has a bottom surface 3, and two side surfaces 4 and 5. Further, bottom ribs 6 are formed at substantially equal intervals along the longitudinal direction of the bottom surfaces. The bottom surface 3 is generally parallel to the main face of the plastic sheet 1. Lower ends of the side surfaces 4 and 5 are continuous with the opposite transversal ends of the bottom surface 3. The side surfaces 4 and 5 are opposed to each other with the bottom surface 3 being present therebetween and slant at substantially equal slant angles. The upper ends of the side surfaces 4 and 5 are continuous with the main face of the plastic sheet 1.

Figure 4:
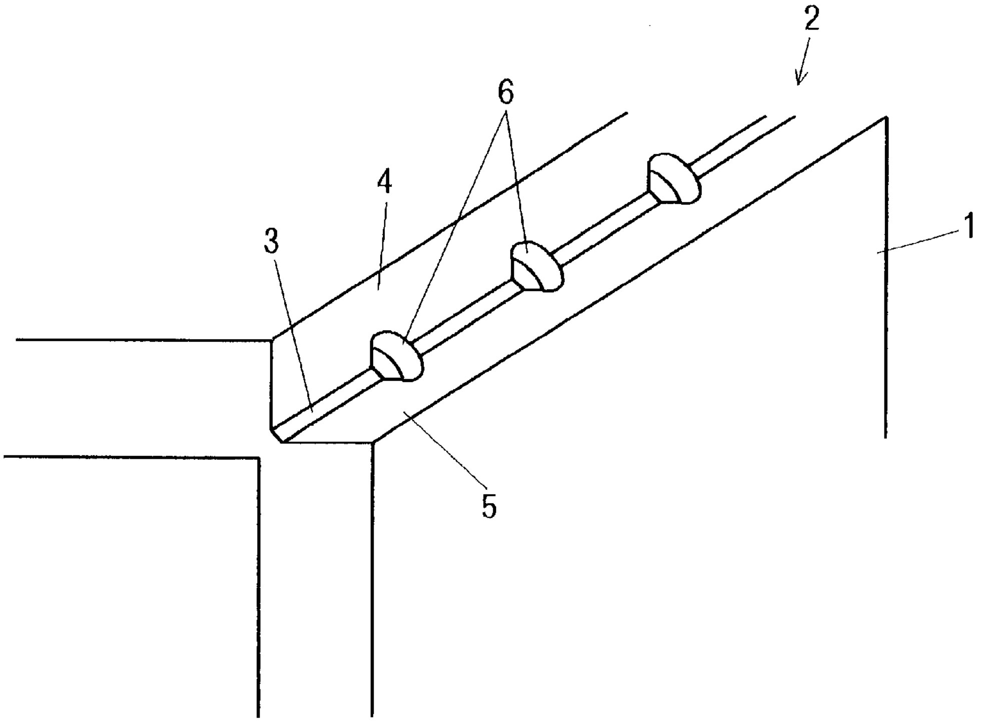
FIG. 4 is a perspective view showing a state in which the plastic sheet is bent along the creasing line.

The bottom surface ribs 6 are disposed substantially uniformly at a predetermined pitch. The bottom surface ribs 6 reinforce the portion of the sheet corresponding to the bottom surface 3 (hereinafter referred to as the "bottom surface portion") and concentrate stresses thereto. Therefore, the bottom surface portion of the sheet can be bent easily without the remaining portions being bent, even when the residual thickness (the thickness of the bottom surface portion) is increased to about 40% the thickness of the plastic sheet 1. FIG. 4 shows the plastic sheet 1 bent along the creasing line 2.

Through fabrication and testing of various samples, the present inventors found that a good result is obtained when the pitch or intervals of the bottom surface ribs; i.e., the ratio of the total area of the ribs 6 to the entire area of the bottom surface 3, is set not greater than 10%. When the ratio was set to a value equal to or greater than 10%, the problem of the bent portion becoming conspicuous arose.

The depth H of the creasing line 2 is preferably set to fall within the range of 60 to 90% the thickness Q of the plastic sheet 1, so that the residual thickness $Q_1$ (=Q−H) becomes 40 to 10% the thickness Q of the plastic sheet 1. The test results show that when the depth H is set to a value less than 60%, bending properties such as easiness in bending deteriorate, and that when the depth H is set to a value greater than 90%, the thickness of the bottom surface portion becomes excessively thin, resulting in breakage of the plastic sheet.

The bottom surface ribs employed in the present embodiment have a substantially semi-circular cross section. When the bottom surface ribs were formed to have a squarish cross section, an increased amount of light scattered at a bent portion corresponding the creasing line, so that the creasing line became conspicuous.

Figure 5:
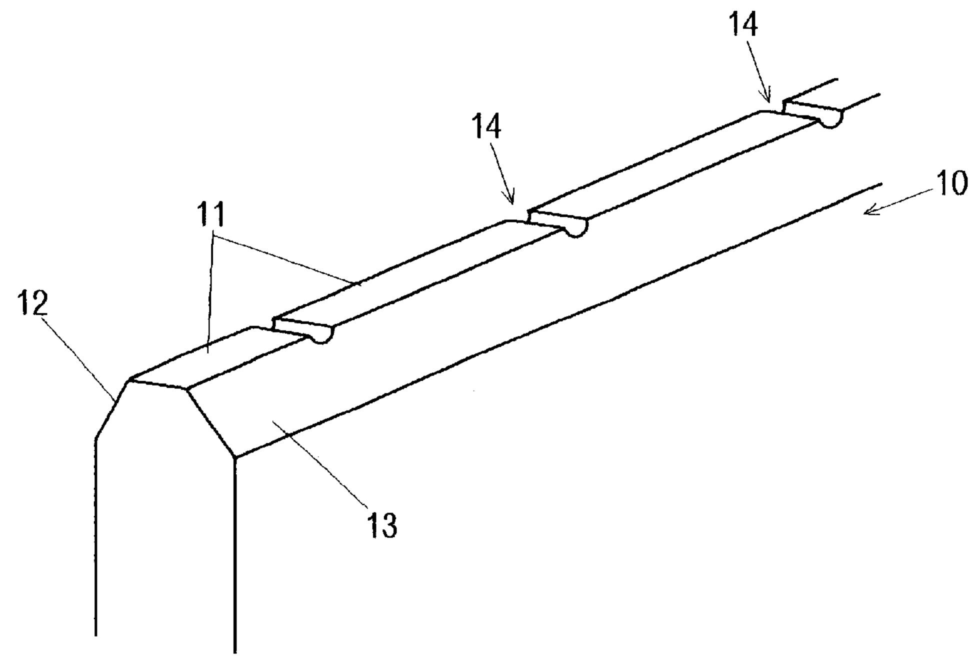
FIG. 5 is a perspective view of a creasing line-forming blade used in the present invention.

The plastic sheet having creasing lines according to the present invention is fabricated by use a creasing line-forming blade 10 as shown in FIG. 5. The creasing line-forming blade 10 has a flat tip-end surface 11 extending in the width direction and a pair of opposed side surfaces 12 and 13 each continuing from the tip-end surface 11 and slanting at a certain angle. Depressions or grooves 14 each having a semi-cylindrical shape are formed in the tip-end surface at substantially equal intervals. The creasing line-forming blade 10 is pressed against a plastic sheet 1 in order to form a creasing line 2 having a depth 0.6 to 0.9 times the thickness Q of the sheet.

More specifically, the plastic sheet 1 is placed on a support base made of, for example, an iron plate, and the creasing line-forming blade 10 is pressed against the main face of the plastic sheet 1 substantially perpendicular thereto. Thus, the creasing line 2 is formed.

The plastic sheet having creasing lines fabricated in accordance with the above-described method can be easily bent at each creasing line, and hardly causes warpage, waving, or springback after being bent. Since warpage hardly occurs after the bending operation, the plastic sheet can be easily transported one sheet at a time in a bonding step, which is a step succeeding the bending step. This enables mass production of plastic containers through automation.

Further, in the plastic sheet having creasing lines according to the present invention, when the bottom surface portion is bent, stresses concentrate at the bottom surface portion, so that only the bottom surface portion is bent. Accordingly, desirable bending properties can be obtained, and the thickness $Q_1$ of the bottom surface portion can be set within a wide range in accordance with the application of the plastic sheet 1. For example, when relatively heavy contents are placed in the container, the thickness $Q_1$ of the bottom surface portion can be increased in order to prevent breakage of the sheet 1 from the creasing line. Even in such a case, a problem in relation to appearance such as waving at corner portions does not arise.

In the above-described embodiment, the bottom surface ribs each have a semi-circular cross section. However, the present invention is not limited thereto, and the bottom surface ribs may be formed to have any cross section having no corner, insofar as the bottom surface ribs provide the same effects. When the bottom surface ribs are formed to have such a non-semicircular cross section, the shape of the grooves 14 of the creasing line-forming blade 10 is changed accordingly.

Figure 6A:
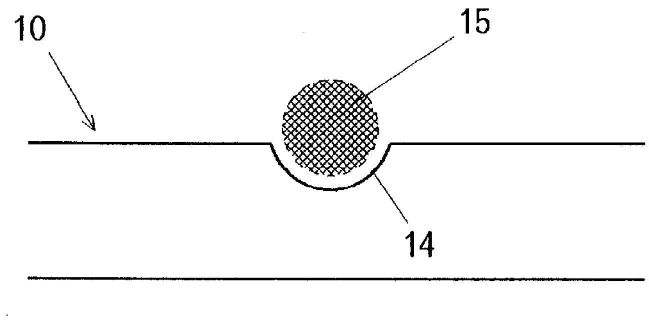
FIGS. 6A and 6B are explanatory views showing a method of fabricating the creasing line-forming blade of FIG. 5.
Figure 6B:
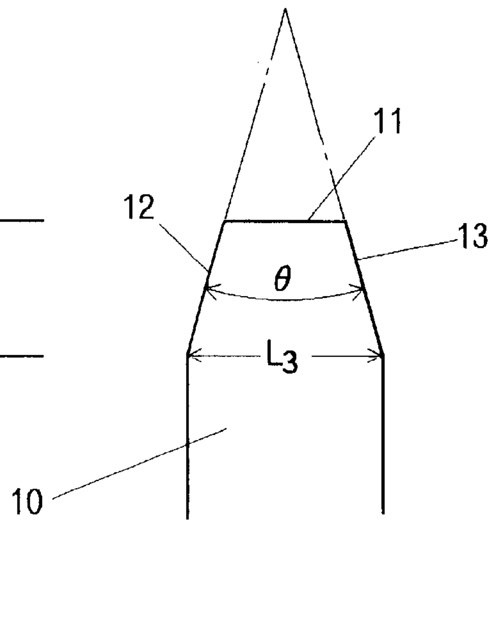
Figure 7:
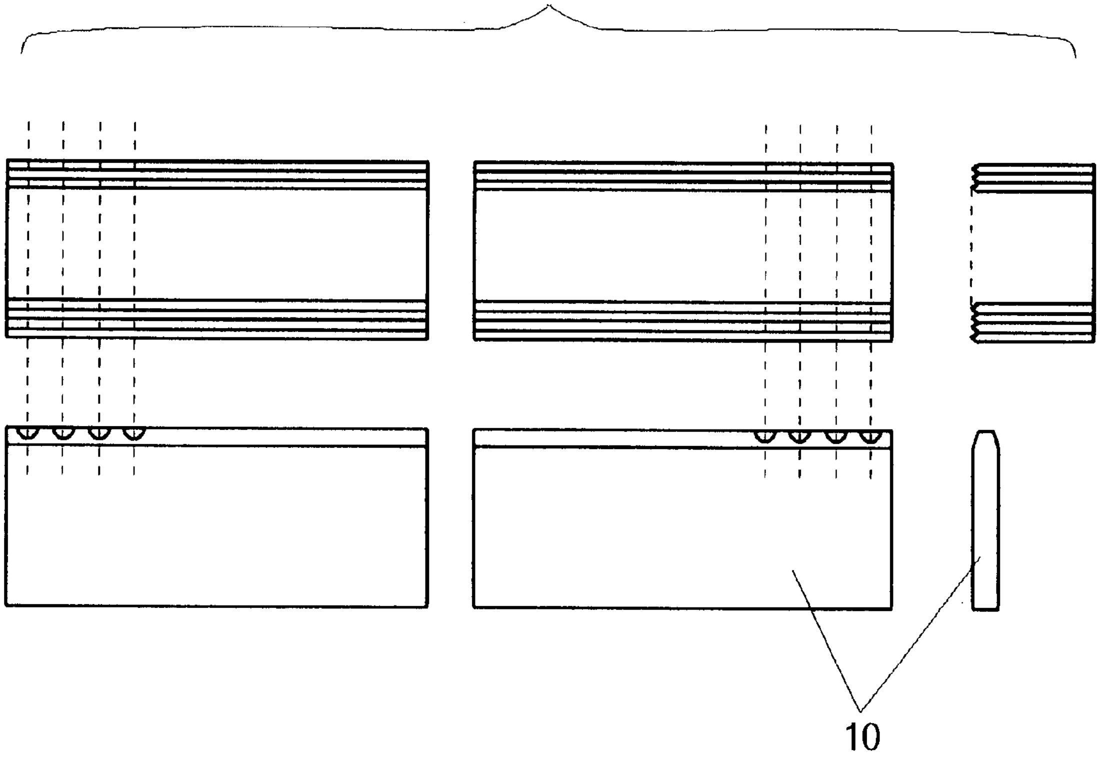
FIG. 7 is an explanatory view showing a method of fabricating the creasing line-forming blade of FIG. 5.

FIGS. 6A and 6B show an example method of fabricating the creasing line-forming blade 10. A cylindrical member 15 is pressed against the flat tip-end surface of the creasing line-forming blade 10 in order to form the grooves 14. FIG. 7 shows an actual method of fabricating the creasing line-forming blade 10. As shown in FIG. 7, a large number of creasing line-forming blades are stacked, and a member for forming the grooves 14 is pressed against the stacked blades in order to form large number of creasing line-forming blades simultaneously. When the member for forming the grooves 14 is pressed against the large number of creasing line-forming blades, the operation of pressing the groove-forming member can be performed stably.

EXAMPLE

An example of the plastic sheet having creasing lines will now be described. In the example, a plastic sheet 1 was formed of a sheet of amorphous polyethylene terephthalate (A. PET) having a thickness of 0.3 mm. Bottom surface ribs 6 of each creasing line 2 were designed to have a semi-circular cross section.

In this example, each creasing line 2 was designed such that the lower-end width $L_1$ of the creasing line was 0.1 mm (about 33% the sheet thickness Q), the upper-end width $L_2$ of the creasing line was 0.5 mm (about 166% the sheet thickness Q), the depth H of the creasing line was 0.22 mm (about 73% the sheet thickness Q), the height of the bottom surface ribs 6 was 0.05 mm (about 16% the sheet thickness Q), and the residual thickness $Q_1$ was 0.08 mm (about 26% the sheet thickness Q). Further, the pitch P of the bottom surface ribs 6 was set to 3 mm. Creasing lines having the above-described dimensions were formed on the plastic sheet 1 by use of a creasing line-forming blade having a corresponding shape. That is, the creasing line-forming blade had a tip-end angle ($\theta$ in FIG. 6B) of about 80°, and a base-end thickness $L_3$ of 1.0 mm.

Specifically, the plastic sheet 1 was placed on a support base made of an iron plate, and the creasing line-forming blade 10 was pressed against the main face of the plastic sheet 1 substantially perpendicular thereto, such that the tip end of the creasing line-forming blade 10 intruded into the plastic sheet 1. Thus, a groove serving as a creasing line was formed such that ribs having a width of 0.25 mm were formed at a pitch of 3 mm.

The thus-fabricated plastic sheet had good bending properties. Specifically, when the plastic sheet was bent along the creasing line, only the bottom surface portion was bent, so that a thin, sharp bent portion was obtained, and only a small amount of springback was produced. Further, the durability of the creasing line was excellent. That is, the plastic sheet did not break during a bending test in which in the plastic sheet was folded back and forth 30 times over an angle of 360°.

As described above in detail, in the plastic sheet having creasing lines according to the present invention, a plurality of projections formed at the bottom surface portion reinforce the bottom surface portion. In addition, during a bending operation, stresses concentrate at the bottom surface portion, so that the plastic sheet bends only at the bottom surface portion. Therefore, desirable bending characteristics are attained, and the thickness of the bottom surface portion can be set within a wider range in accordance with the application of the plastic sheet.

Moreover, when a plastic sheet having creasing lines is fabricated by use of a creasing line-forming blade according to the present invention and in accordance with the method according to the present invention, the plastic sheet does not break at a creasing line even when the plastic sheet is pressed to such a degree that the depth of a groove serving as the creasing line becomes 0.9 times the sheet thickness. Therefore, distortion, warpage, waving, or other types of deformations are not produced during processing of the plastic sheet. Thus, automated fabrication of plastic containers can be realized with ease.

Obviously, numerous modifications and variations of the present invention are possible in light of the above teachings. It is therefore to be understood that within the scope of the appended claims, the present invention may be practiced otherwise than as specifically described herein.

What is claimed is:

1. A plastic sheet comprising:

a creasing line formed of a groove having a bottom surface and a pair of opposed side surfaces each slanting at a certain angle; and a plurality of substantially semi-cylindrical ribs formed on the bottom surface at substantially equal intervals along a longitudinal direction of the groove such that the substantially semi-cylindrical ribs extend perpendicularly to the longitudinal direction and such that the ribs connect the opposed side surfaces, wherein an area occupied by the ribs accounts for about 5% to about 10% of the entire area of the bottom surface as measured when the ribs are not present.

2. A method of producing a plastic sheet comprising:

forming a groove serving as a creasing line and having a bottom surface and a pair of opposed side surfaces each slanting at a certain angle, such that a plurality of substantially semi-cylindrical ribs are formed on the bottom surface at substantially equal intervals along a longitudinal direction of the groove such that the substantially semi-cylindrical ribs extend perpendicularly to the longitudinal direction and such that the ribs connect to the opposed side surfaces, wherein an area occupied by the ribs accounts for about 5% to about 10% of the entire area of the bottom surface as measured when the ribs are not present.

* * * * *